(12) United States Patent
Mendia Olabarria

(10) Patent No.: US 9,033,627 B2
(45) Date of Patent: May 19, 2015

(54) SYSTEM FOR COMPENSATING FOR THE RAM DROP IN A MACHINE-TOOL

(75) Inventor: Angel Maria Mendia Olabarria, Bergara (ES)

(73) Assignee: SORALUCE, S. COOP., Bergara (Gipuzkoa) (ES)

(*) Notice: Subject to any disclaimer, the term of this patent is extended or adjusted under 35 U.S.C. 154(b) by 738 days.

(21) Appl. No.: 13/141,148

(22) PCT Filed: Oct. 15, 2009

(86) PCT No.: PCT/ES2009/000497
§ 371 (c)(1),
(2), (4) Date: Jun. 21, 2011

(87) PCT Pub. No.: WO2010/072856
PCT Pub. Date: Jul. 1, 2010

(65) Prior Publication Data
US 2011/0255933 A1   Oct. 20, 2011

(30) Foreign Application Priority Data
Dec. 24, 2008 (ES) .................................. 200803689

(51) Int. Cl.
*B23Q 15/18* (2006.01)
*B23Q 11/00* (2006.01)
(52) U.S. Cl.
CPC ....... *B23Q 11/0028* (2013.01); *Y10T 409/3098* (2015.01); *B23Q 15/18* (2013.01); *Y10T 409/309688* (2015.01); *Y10T 409/309744* (2015.01); *B23Q 11/0017* (2013.01)
(58) Field of Classification Search
CPC ................................ B23Q 15/18; B23Q 17/22

USPC ........................ 409/238, 239, 207, 208, 141
See application file for complete search history.

(56) References Cited

U.S. PATENT DOCUMENTS

| 2,912,905 | A | * | 11/1959 | Berthiez ........................ 409/238 |
| 3,227,047 | A | * | 1/1966 | Jones et al. ..................... 409/239 |
| 3,656,860 | A | | 4/1972 | Neuman |
| 5,423,237 | A | | 6/1995 | Line |
| 6,652,204 | B2 | * | 11/2003 | Stengele et al. ............... 409/235 |
| 2002/0197125 | A1 | * | 12/2002 | Yen et al. ........................ 409/238 |

FOREIGN PATENT DOCUMENTS

| CZ | 278763 B6 | 4/1994 |
| CZ | 279142 B6 | 1/1995 |
| FR | 2596309 A1 | 10/1987 |

(Continued)

OTHER PUBLICATIONS

The English language translation of the International Preliminary Report on Patentability and Written Opinion dated Jul. 14, 2011 for PCT/ES2009/000497.

*Primary Examiner* — Sunil K Singh
*Assistant Examiner* — Ryan Rufo
(74) *Attorney, Agent, or Firm* — Lucas & Mercanti, LLP

(57) ABSTRACT

The present invention relates to a compensation system for compensating for the drop of the ram in a machine tool, comprising a vertical translation carriage (1) incorporating the application ram, at least one and preferably two perforated plates (2) being arranged on said carriage (1), on each of which there is incorporated a fixed sliding block (3) and movable sliding blocks (4), which blocks are linked with a guide for the transverse movement of the ram, such that the drop of the ram is compensated for by means of the controlled bending of the plates (2).

8 Claims, 10 Drawing Sheets

(56) References Cited

FOREIGN PATENT DOCUMENTS

| GB | 1218261 A | 1/1971 | | |
|---|---|---|---|---|
| IT | 1311789 | 5/1999 | | |
| IT | 1318293 | 7/2000 | | |
| JP | 60-056852 A | * | 4/1985 | ............. B23Q 15/18 |
| JP | 11-138305 A | * | 5/1999 | ............. B23B 19/02 |
| JP | 2000-233343 A | * | 8/2000 | ............. B23Q 15/18 |
| JP | 2007-021606 A | * | 2/2007 | ............. B23Q 41/00 |

* cited by examiner

SYSTEM FOR COMPENSATING FOR THE RAM DROP IN A MACHINE-TOOL

This application is a National Phase of International Application PCT/ES2009/000497, filed Oct. 15, 2009, which claims the priority of Spanish application No. P 200803689, filed Dec. 24, 2008, both applications are incorporated by reference, herein.

FIELD OF THE ART

The present invention relates to systems for compensating for the drop of the ram used in the field of machine tools, and more specifically in milling machines, proposing to that end a compensation system based on bending counter-guides correcting the deviation induced in the ram and therefore in the head of the tool.

STATE OF THE ART

The search for precision and parts having a finish of better quality is a continuous improvement process for manufacturers in the machine tool field.

Clients demand increasingly smaller tolerances in machined parts, and the response to this need is to maintain a constant deviation-free path in the machining process, such as for example, maintaining perfect perpendicular position of the tool on the work plane.

The deviations induced in the ram and therefore in the head of the tool due to the gravitational effect induced by the weight of the assembly upon moving away from the column of the machine by transverse movement cause precision errors in the positioning of the tool on the part to be machined.

These precision errors can be corrected by means of using devices managed by numerical control (CNC), but when the tool has moved away from the movable elements of the machine, any deviation occurring is multiplied by the distance, being more complicated to correct said error by means of numerical control programming.

Based on this concept, there are different systems for correcting the deviation of the ram in machines tools, such as milling machines, caused by the weight of the ram itself and of its head in transverse translation movement, these systems being based on devices operated by means of rotation systems or elements.

Italian patent IT1318293 discloses a machine tool such as a milling machine having a system for correcting the drop of the ram based on an assembly of pivots performing an eccentric rotational movement by means of the action of a geared motor, achieving the lifting of the ram to counteract the pitching caused by its own weight.

Czech Republic patents CZ279142 (B6) and CZ278763 (B6) disclose two other systems based on an assembly of pulleys which, by means of the action of a counterweight, prevent the drop of the ram, maintaining its horizontal position during the translation movement thereof when it moves away from the column.

Italian patent IT1311789 relates to a device for compensating for the mandrel drop, preferably in the horizontal direction, by means of the action of a pulley and chain system acting on the ram, preventing its drop.

OBJECT OF THE INVENTION

According to the present invention, there is proposed a system for correcting the errors resulting from the drop of the ram in a milling machine or the like by means of the action of bending counter-guides causing the raising of the ram while it moves away from the column of the machine, whereby achieving a perfect horizontal position of the ram during its entire translation movement and a perfect perpendicular position of the working tool.

The system object of the invention is made up of at least one, preferably two, perforated plates which act as a bending counter-guide, a fixed sliding block and at least one movable sliding block being arranged on each plate although there will preferably be two movable sliding blocks, which fixed and movable sliding blocks are linked with a conventional guide for the transverse movement of the ram with respect to the column of the machine.

A continuous measuring control controls the drop of the ram by means of checking its transverse movement and the vertical position of its head, sending a signal to an operating assembly acting on the counter-guide plates, deforming them and driving the movable sliding blocks, causing the lifting of the ram and thus correcting its translation movement.

The concept distinguishing the system object of the invention from the systems based on rotational elements described above is the elastic bending deformation of the counter-guide plates which can be provided with notches in their side profiles to favor bending precisely at said points.

A compensation system for compensating for the drop of the ram is thus achieved which, due to its constructive and functional features, is very advantageous, acquiring its own identity and preferred character for the application function for which it is intended in relation to obtaining a perfectly horizontal exit of the ram from the column of the corresponding machine and a perfectly vertical arrangement of the tool.

DETAILED DESCRIPTION OF THE INVENTION

The object of the invention relates to a compensation system for compensating for the drop of the ram used in machines tools, for example in milling machines, to achieve a perfectly horizontal exit of the ram from the column of the machine and a perfectly vertical arrangement of the tool.

Figure 1:
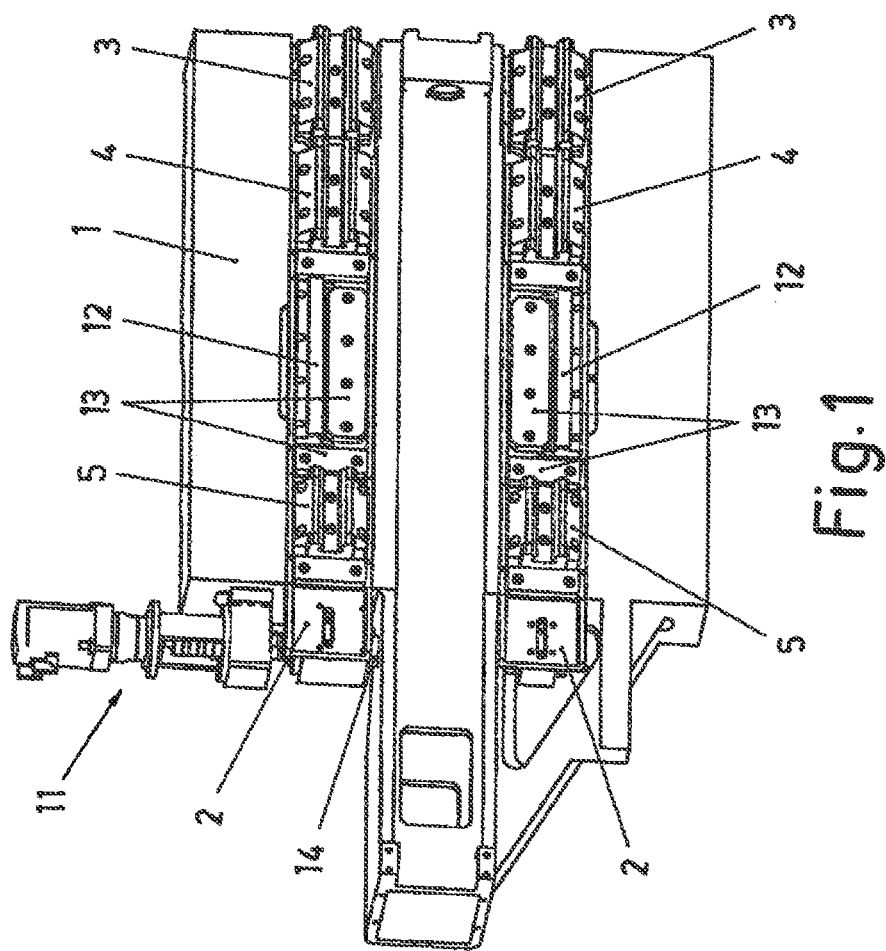
FIG. 1 shows a perspective view of the compensation system for compensating for the drop of the ram of a machine tool according to the object of the invention.
Figure 2:
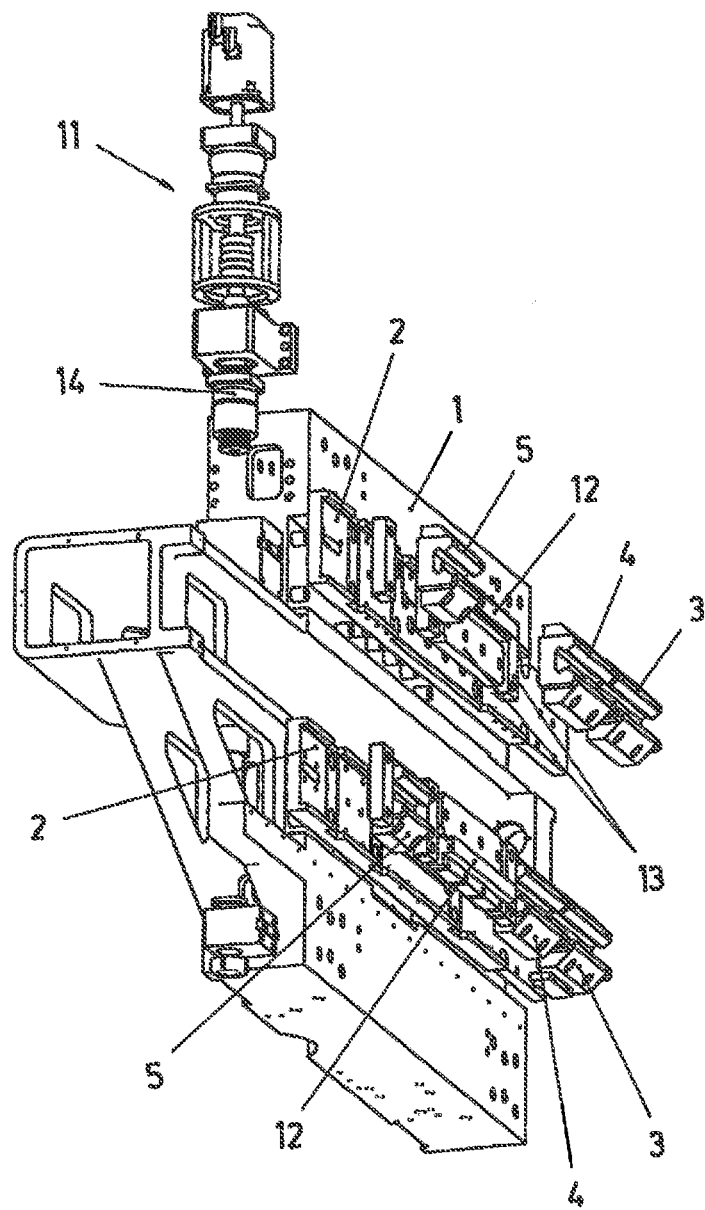
FIG. 2 shows an exploded perspective view with reference to the preceding figure.
Figure 3:
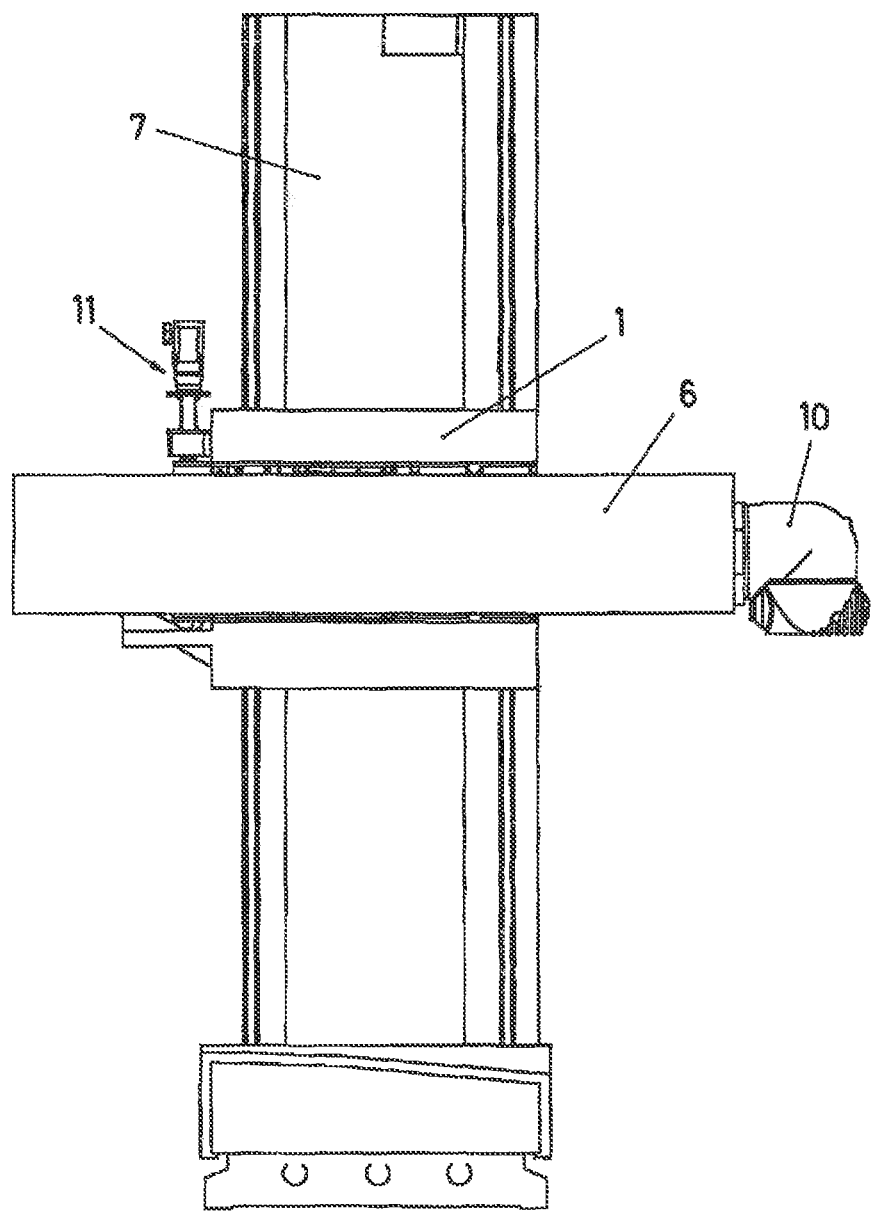
FIG. 3 shows a front view of the system object of the invention arranged at the application site on the vertical column of the machine, with the ram assembled on said system.
Figure 4:
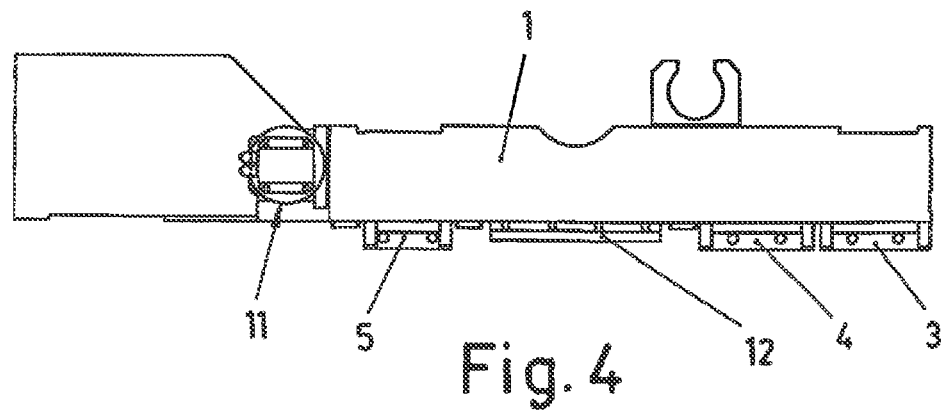
FIG. 4 is a plan view of the compensation system for compensating for the drop of the ram.
Figure 5:
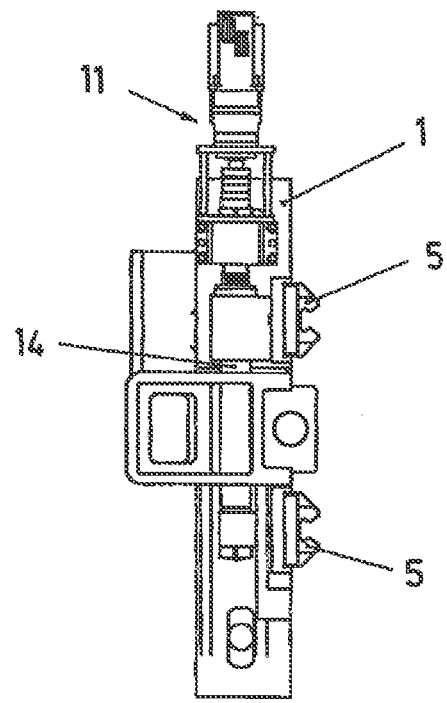
FIG. 5 shows a side view from the rear part of the compensation system.

As observed in FIG. 1, the system object of the invention is made up of a vertical translation carriage (1) on which there is located at least one perforated plate (2) and preferably two plates (2) which act as a bending counter-guide, a fixed sliding block (3) and at least one movable sliding block being arranged on each of said plates (2), although there will preferably be two movable sliding blocks (4, 5) as depicted in the attached drawings. The fixed sliding block (3) and the movable sliding blocks (4, 5) are linked with a conventional guide (not depicted) for the transverse movement of the ram (6) with respect to the column (7) of the application machine tool according to FIG. 3.

Figure 8:
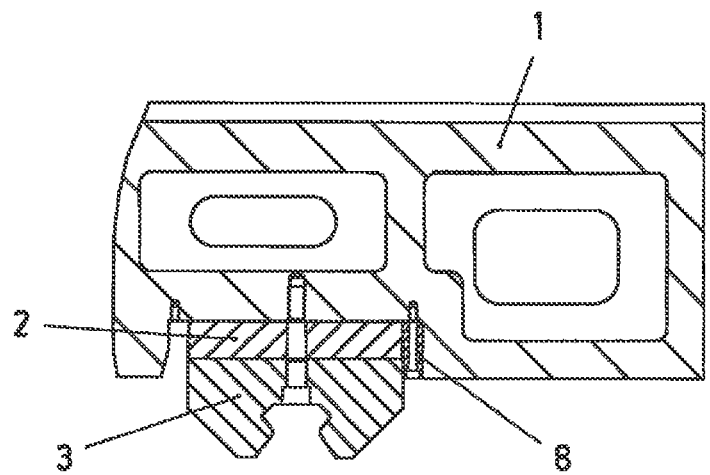
FIGS. 8 and 8A are a section view and an exploded section view of the fixed sliding block of the compensation system for compensating for the drop of the ram.
Figure 8A:
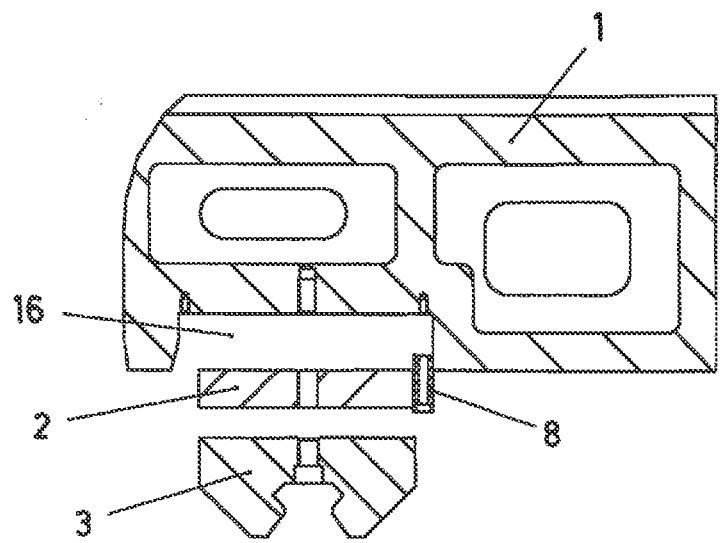
Figure 9:
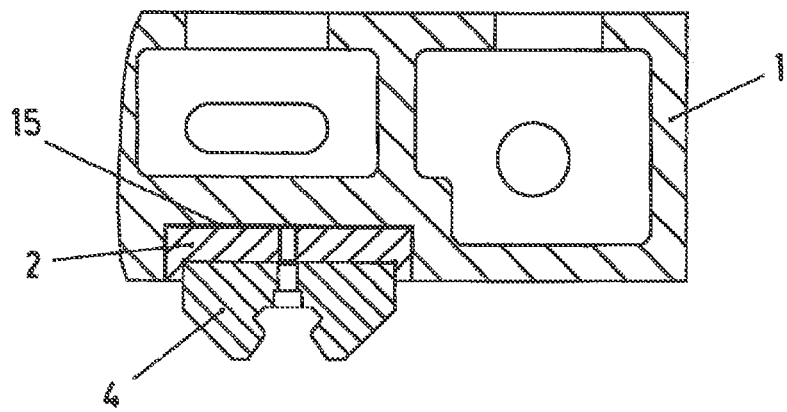
FIGS. 9 and 9A are a section view and an exploded section view of a movable sliding block of the compensation system for compensating for the drop of the ram.
Figure 9A:
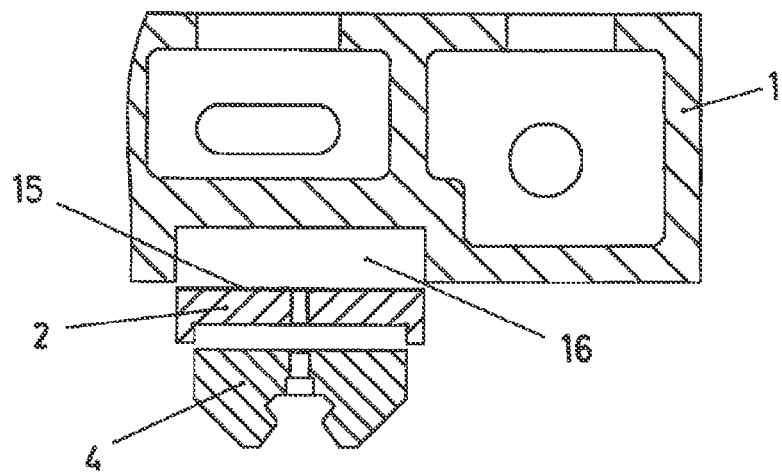
Figure 10:
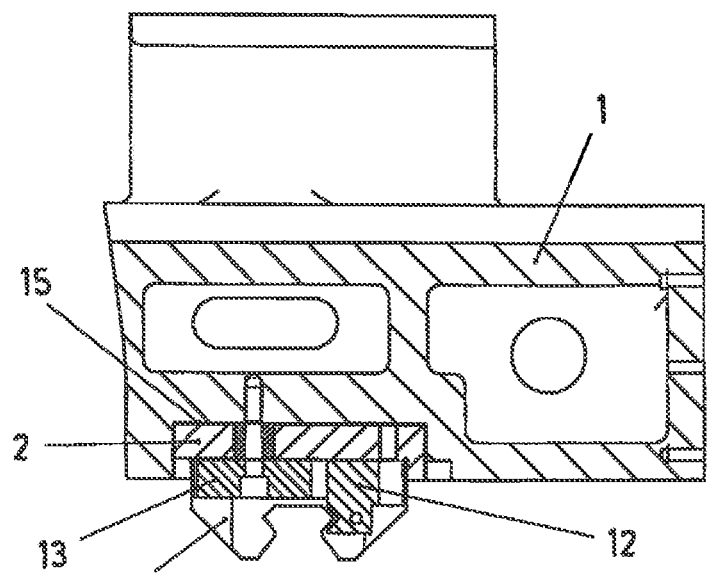
FIGS. 10 and 10A are a section view and an exploded section view of contact parts for contacting with the guide of the ram.
Figure 10A:
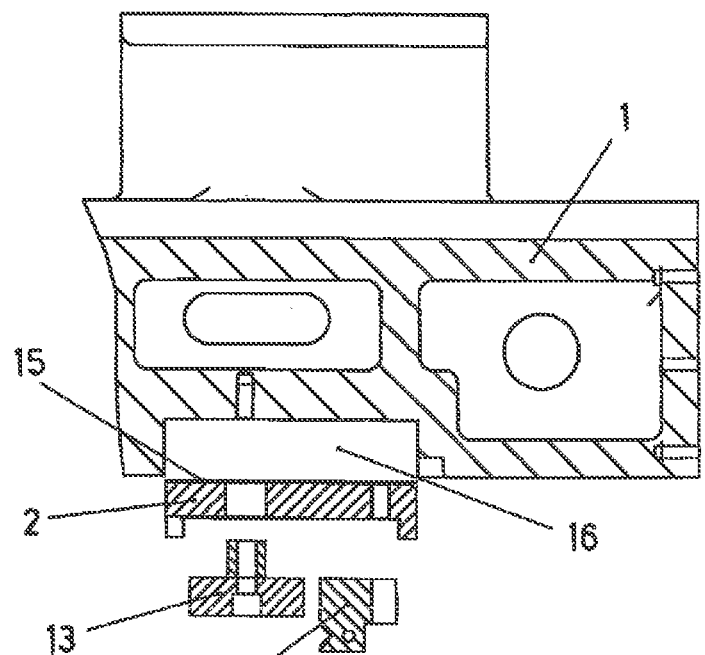
Figure 11:
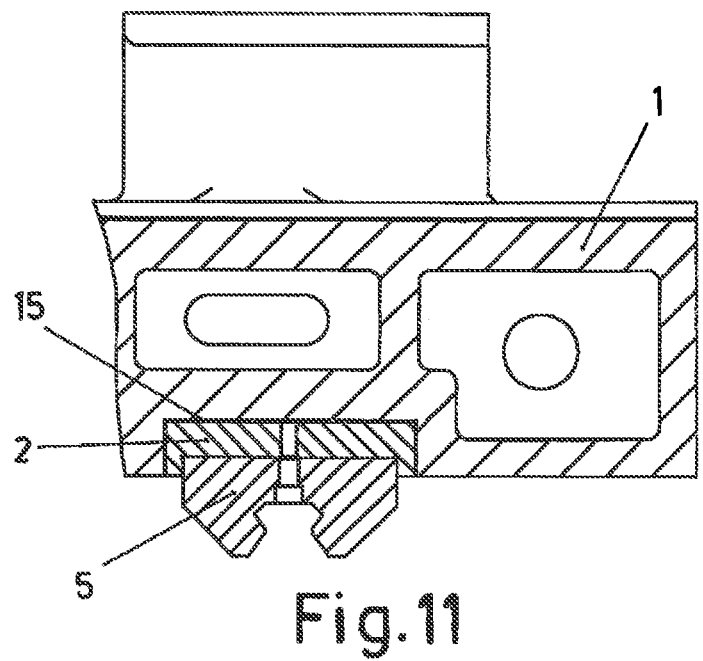
FIGS. 11 and 11A are a section view and an exploded section view of another movable sliding block of the compensation system for compensating for the drop of the ram.
Figure 11A:
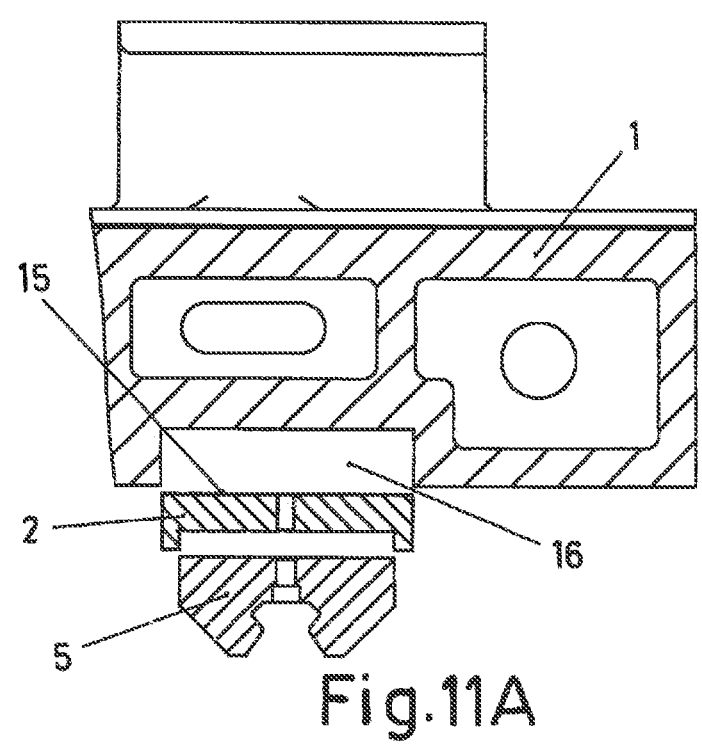

The fixed sliding blocks (3) are held to the carriage (1) (see FIGS. 8 and 8A) by means of stops (8) which are located halfway between the side profile of the respective plate (2) and a face defined in an inner housing (16) of the carriage (1), preventing any type of movement, these sliding blocks (3) thus being a fixed point on which the entire system swings. The movable sliding blocks (4, 5) are only held to the plates (2) but not to the carriage (1), as can be observed in FIGS. 9 and 11, such that they can have a slight rotational movement as a result of a small allowance existing between the side profiles of the plate (2) and the faces of the inner housing (16) of the carriage (1).

Figure 6:
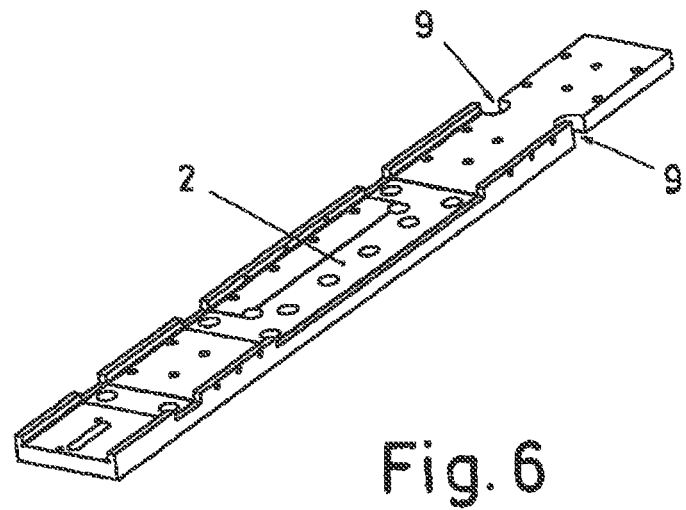
FIG. 6 is a perspective view of a perforated plate of those acting like a bending counter-guide in the system object of the invention.
Figure 7:
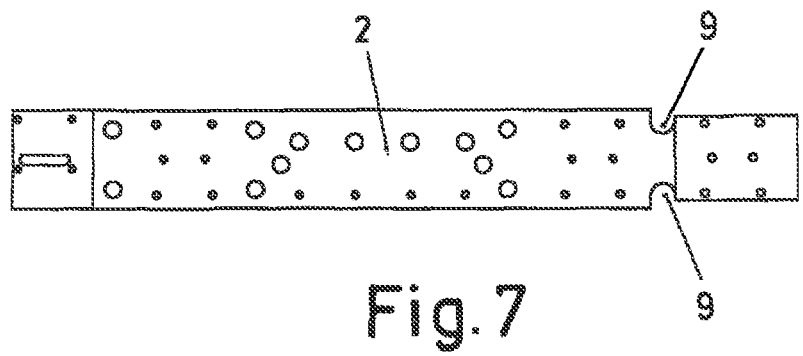
FIG. 7 is a front view of the plate of Figure anterior.

FIGS. 6 and 7 show how the plates (2) have notches (9) at one end of their side profiles allowing elastic deformation of said plates (2), the bending thereof being favored at said points.

The system object of the invention has a continuous measuring control based, for example, on an absolute encoder reading the actual position of the ram (6) and the head (10) during the translation movement of the assembly with respect to the column (7) of the machine.

The absolute encoder thereby sends a set point signal to an operating assembly (11) which can be made up of a gear motor, followed by a coupling, and a planetary roller screw support or similar solutions, which operating assembly (11) pushes the plates (2) attached to one another by supports (14) by means of a very reduced movement, i.e., slow but with great force, deforming the plates (2) and driving the movable sliding blocks (4, 5) (approximately 0.1 mm), causing the raising of the ram (6) and correcting the error caused by its drop.

Figure 12:
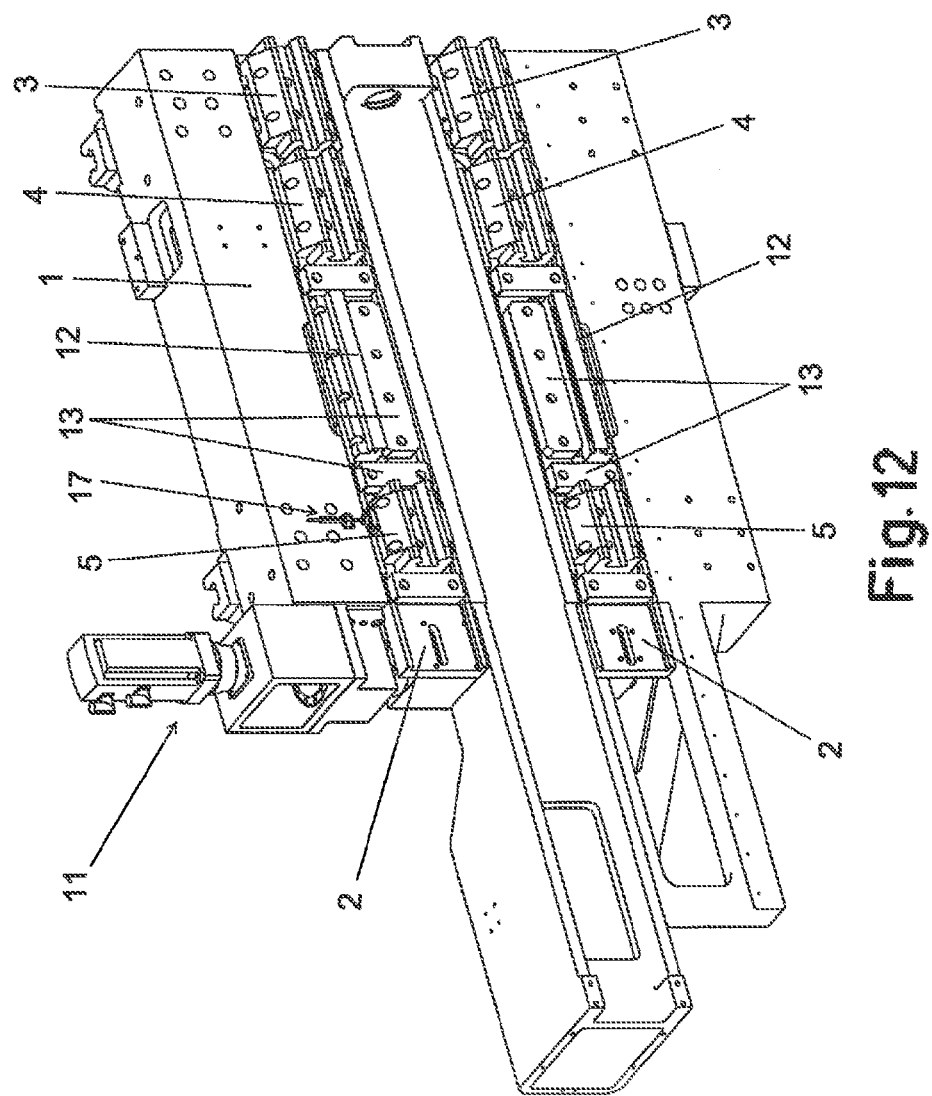
FIG. 12 shows a perspective view of the compensation system for compensating for the drop of the ram with a sensor for measuring linear movement associated with one of the movable sliding blocks.

As shown in FIG. 12, the continuous measuring control can be made up of a sensor (17) for measuring linear movement, specifically a linear detection device which is arranged on the carriage (1) and is associated with one of the movable sliding blocks (4, 5), it is preferably associated with the movable sliding block (5) furthest away and in a higher position with respect to the head (10) carrying the working tool.

To prevent the effect of the drop caused by the weight itself of the ram and its head, the transverse movement of the ram is basically interpolated with the vertical movement thereof, different interpolation ramps being achieved depending on the type of head assembled in the machine tool.

Contact parts (12) for contacting with the guide (not depicted) for the transverse movement of the ram (6) through a damping material minimizing friction are located between the movable sliding blocks (4, 5), a smoother movement being produced, reducing the equipment wear effect.

Likewise, flanges (13) are placed between the movable sliding blocks (4, 5) and the parts (12) for sliding adjustment, which flanges are anchored to the plates (2) by means of bushings having a smaller diameter than the holes in which they are fitted, thus allowing the rotation of the plates (2) but eliminating the deformation and lateral movement.

Sheets (15) of a damping material, the static expansion coefficient of which is slightly less than dynamic expansion coefficient, can also be placed between the plates (2) and the carriage (1), whereby achieving constant movement during the contact between the surface of the plates (2) and carriage (1), the occurrence of dynamic jerking (known as the stick-slip effect) being minimized.

It is also possible for the sheets (15) to be provided with grooves for the free circulation of a lubricant (grease or oil) between the plates (2) and the carriage (1), which provides a damping effect to the entire assembly.

Based on the foregoing, a guiding system is thus obtained which allows correcting the errors resulting from the drop of the ram and it can in turn work like a damping system.

The invention claimed is:

1. A system for compensating for a drop of a ram in a machine tool, the system comprising:
    a vertical translation carriage on a column bearing a ram, the ram having a head and an end, the head carrying a working tool;
    a perforated plate located on the vertical translation carriage;
    a movable block attached to the perforated plate;
    a fixed block attached to the perforated plate and to vertical translation carriage, the fixed block being located between the movable block and the head of the ram, wherein:
        the fixed block functions as a pivot relative to which the head of the ram and the movable block both move together in a clockwise direction or both move together in a counter-clockwise direction;
    a sensor adapted to determine a drop of the head of the ram, based on a detected rise of the movable block; and
    an operating assembly adapted to cause a controlled bending of the perforated plate, in response to the determination of the drop of the head of the ram, wherein the controlled bending of the perforated plate causes movement of the movable block in a direction counteracting the drop of the head of the ram, wherein movement of the movable block in the counteracting direction causes the head of the ram to rise, thereby compensating for the drop of the head of the ram.

2. The system of claim 1, further comprising:
    at least one stop adapted to hold the fixed block on the vertical translation carriage, the at least one stop being located between the perforated plate and a face defined in an inner housing of the vertical translation carriage.

3. The system of claim 1, wherein the perforated plate has at least two notches on one or more sides, wherein the one or more notches are conducive to bending due to elastic deformation in an area associated with the at least two notches.

4. The system of claim 1, further comprising:
    one or more grooved sheets of a damping material disposed between the perforated plate and the vertical translation carriage, the one or more grooved sheets allowing circulation of a lubricant to provide a damping effect.

5. The system of claim 1, wherein the sensor is further adapted to:
    measure linear movement associated with the movable block.

6. The system of claim 1, wherein:

the perforated plate is attached to a support element;

the operating assembly causes the controlled bending of the perforated plate by pushing the support element in the direction counteracting the drop of the head of the ram.

7. The system of claim 1, wherein:

movement of the movable block in the counteracting direction causes the ram to pivot around the fixed block, causing the head of the ram to rise.

8. A machine tool comprising:

a vertical translation carriage on a column;

a ram comprising a head adapted to carry a working tool, the ram being further adapted for transverse movement with respect to the column;

a perforated plate coupled to the vertical translation carriage;

a fixed block coupled to the vertical translation carriage and fixed with respect to the vertical translation carriage;

a movable block coupled to the perforated plate and movable with respect to the vertical translation carriage, wherein:

the fixed block is located between the movable block and the head of the ram, and functions as a pivot relative to which the head of the ram and the movable block both move together in a clockwise direction or both move together in a counter-clockwise direction;

the machine tool further comprising:

an operating assembly adapted to:

detect a drop of the head of the ram; and cause the perforated plate and the movable block to move in a direction counteracting the drop of the head of the ram, wherein the movement of the movable sliding block in the counteracting direction causes a pivoting movement of the ram around the fixed block, thereby causing the head of the ram to rise.

\* \* \* \* \*